United States Patent
Chen

(10) Patent No.: US 7,011,443 B2
(45) Date of Patent: Mar. 14, 2006

(54) BACKLIGHT MODULE WITH SIDE FIXING FRAMES AND ASSEMBLY METHODS THEREOF

(75) Inventor: Jinzu Chen, Osato (TW)

(73) Assignee: Quanta Display Inc., Tao Yuan Shien (TW)

( * ) Notice: Subject to any disclaimer, the term of this patent is extended or adjusted under 35 U.S.C. 154(b) by 71 days.

(21) Appl. No.: 10/790,149

(22) Filed: Mar. 2, 2004

(65) Prior Publication Data

US 2005/0057914 A1    Mar. 17, 2005

(30) Foreign Application Priority Data

Sep. 12, 2003   (TW) ............................... 92125282 A

(51) Int. Cl.
*F21V 8/00*    (2006.01)
(52) U.S. Cl. ...................................... 362/633; 362/634
(58) Field of Classification Search ................ 362/561, 362/630, 631, 632, 633, 634, 609, 611, 612, 362/613, 614; 349/58, 60
See application file for complete search history.

(56) References Cited

U.S. PATENT DOCUMENTS

| 5,537,296 | A  | * | 7/1996 | Kimura et al. ............... 362/634 |
| 6,480,245 | B1 | * | 11/2002 | Sakamoto et al. ............ 349/58 |
| 6,867,827 | B1 | * | 3/2005 | Cha et al. ..................... 349/58 |

* cited by examiner

*Primary Examiner*—Y. My Quach-Lee
(74) *Attorney, Agent, or Firm*—Nath & Associates PLLC; Gregory B. Kang; Teresa M. Arroyo

(57) ABSTRACT

A backlight module with side fixing frames and assembly methods thereof are provided. The backlight module has a stack assembly including a supporting frame, a reflecting plate and a light guiding plate. At least one optical film is placed on the stack assembly, and at least one lamp assembly is accommodated at each side of the light guiding plate. At least one side fixing frame is disposed at the side of the stack assembly where the lamp assembly is accommodated. The side fixing frame is provided with a groove for containing the lamp assembly and fastening the stack assembly. The side fixing frame fastens the stack assembly and in combination with the optical film forms the backlight assembly. The backlight module is simpler, stronger, and more easily assembled. The manufacturing cost is also reduced.

15 Claims, 3 Drawing Sheets

BACKLIGHT MODULE WITH SIDE FIXING FRAMES AND ASSEMBLY METHODS THEREOF

BACKGROUND OF THE INVENTION

1. Field of the Invention

The present invention relates to a backlight module, and particularly to a backlight module with side fixing frames to contain lamp assemblies and fasten a stack assembly including a supporting frame, a reflecting plate and a light guiding plate.

2. Description of the Prior Art

As semiconductor fabrication technologies are rapidly advanced, display devices are required to be lighter, smaller and slimmer. This is especially the true for flat panel display devices such as liquid crystal displays and plasma displays. Therefore, the industry endeavors in reducing the assembly elements and the process to the extent possible.

LCD monitors are widely used in desktop computers and notebook computers. An LCD panel assembly and a backlight module are respectively assembled using separate assembly processes before both are assembled together. FIG. 1 is a conventional backlight assembly. The components of the liquid crystal display device such as a reflecting plate, a light guiding plate, a diffusing film and lamp assembly are assembled together between an upper frame 100 with a central opening and a supporting frame 200. There are several engaging elements 101 on the edges of the upper frame 100 to couple with counterparts 201 on the edges of the supporting frame 200 so that the above components are fastened and secured. Making liquid crystal display devices lighter and slimmer causes the upper frame 100 to be made too soft and results in the difficulty of mold injection. Furthermore, cost increases because the structure and assembly become more complicated.

U.S. Pat. No. 6,502,945B2 discloses a stack type backlight module and an assembly method thereof. The stack type backlight module includes a mold frame, a reflecting plate, a light guiding plate placed on the reflecting plate, a pair of lamp assemblies respectively accommodated on each side portion of the light guiding plate, diffusing plates placed on the light guide and a pair of fixing frames facing each other covering the edge of the light guiding plate, and being detachably coupled to the mold frame.

U.S. Pat. No. 6,502,945B2 utilizes two L-shaped mold frames and a supporting frame to serve as a support for assembling other components. The L-shaped mold frames are coupled with the supporting frame to fasten the other components. Therefore, the whole structure of the stack type backlight module is more complicated.

Moreover, the components of the stack type backlight module must be put together from top to bottom. While assembling the upper frame, the L-shaped mold frames would obstruct the view of the operator so that he cannot check whether the wire of the lamp assembly has shifted or become damaged during the assembly process. Therefore, it is necessary to perform a testing process after completion of the assembly process. This extra step causes the manufacturing yield to be decreased. In order for the backlight module to be stable, the L-shaped mold frames need sufficient width and thickness to be strong. This reduces the view field of the liquid crystal display panel. The width from the edge of the view field of the liquid crystal display panel to the outer edge of the liquid crystal display assembly is extended and cannot be narrowed down. As a result, both of the size and weight of the liquid crystal display device are increased.

With the intention of overcoming the above drawbacks and of producing a lighter, thinner and more stable structure, the present invention is created.

SUMMARY OF THE INVENTION

One objective of the present invention is to provide a backlight module with side fixing frames, which can be easily assembled and provides a stable structure.

Another objective of the present invention is to provide a backlight module with side fixing frames, whose structure is simpler and can be easily manufactured.

Still another objective of the present invention is to provide at least one narrow side fixing frame to fasten the backlight module, so that the size of the display can be reduced and the view field of the liquid crystal display panel is not adversely influenced.

In order to achieve the above objectives, the present invention provides a backlight module with side fixing frames. The backlight module has a stack assembly including a supporting frame, a reflecting plate and a light guiding plate; one or more optical films placed on the stack assembly; one or more lamp assemblies accommodated one each side of the light guiding plate; one or more side fixing frames beside the stack assembly where the lamp assembly is accommodated, which side fixing frame is provided with a groove for containing the lamp assembly and fastening the stack assembly, and in conjunction with the optical films to form the backlight module.

The present invention provides a method for assembling a backlight assembly, which includes: placing a reflecting plate on a supporting frame; placing a light guiding plate on the reflecting plate; placing one or more lamp assemblies on each side of the light guiding plate to form a stack assembly; inserting one or more side fixing frames at the sides of the stack assembly where the lamp assembly is accommodated, which the side fixing frame is provided with a groove for containing the lamp assembly and fastening the stack assembly; and placing one or more optical films on the light guiding plate to complete the assembling of the backlight module.

The present invention further provides a method for assembling a backlight module, which includes: placing a reflecting plate on a supporting frame; placing a light guiding plate on the reflecting plate to form a stack assembly; placing a lamp assembly in a groove of a side fixing assembly; inserting the stack assembly by one side in the groove of the side fixing assembly; placing one or more optical films on the light guiding plate to complete the assembling of the backlight module.

BRIEF DESCRIPTION OF THE DRAWINGS

The objectives, features and advantages of the present invention will become apparent from the following detailed description, and in light of the accompanying drawings.

DESCRIPTION OF THE EMBODIMENTS

The present invention utilizes at least one side fixing frame to fasten a backlight assembly. During the assembly process, the operator can view the lamp assembly and check if the lamp assembly has shifted or become damaged. The manufacturing yield will be improved. The side fixing frame is provided with a groove for containing and fastening the backlight assembly. The side fixing frame provides fastening means sufficiently strong for fastening the backlight assembly, even though the side fixing frame is made thinner. The view field of the liquid crystal panel is thus expanded.

The backlight module with side fixing frames is stronger than a conventional backlight assembly. The mold for fabricating the side fixing frame is smaller in size than that needed for a conventional backlight assembly. The temperature of the mold injection and injection velocity are more easily controlled. The manufacturing yield can be improved, and the production cost can be reduced.

Besides, the present invention utilizes the groove of the side fixing frame to contain and fasten the backlight assembly. The clamping strength provided by the groove of the side fixing frame in combination with other fastening means provided by the side fixing frame can fasten the whole backlight module more steadily.

The fastening means of the side fixing frame can be achieved by the clamping strength of the groove of the side fixing frame or by an engaging element formed on the side fixing frame. When the fastening means is a kind of engaging element such as a trench-type coupling element, a hook-type coupling element, a recess structure or a protrusion, a counterpart is formed on a supporting frame for coupling the engaging element.

The present invention will be described in detail in accordance with the following embodiments and as shown in accompanying drawings.

Figure 1:
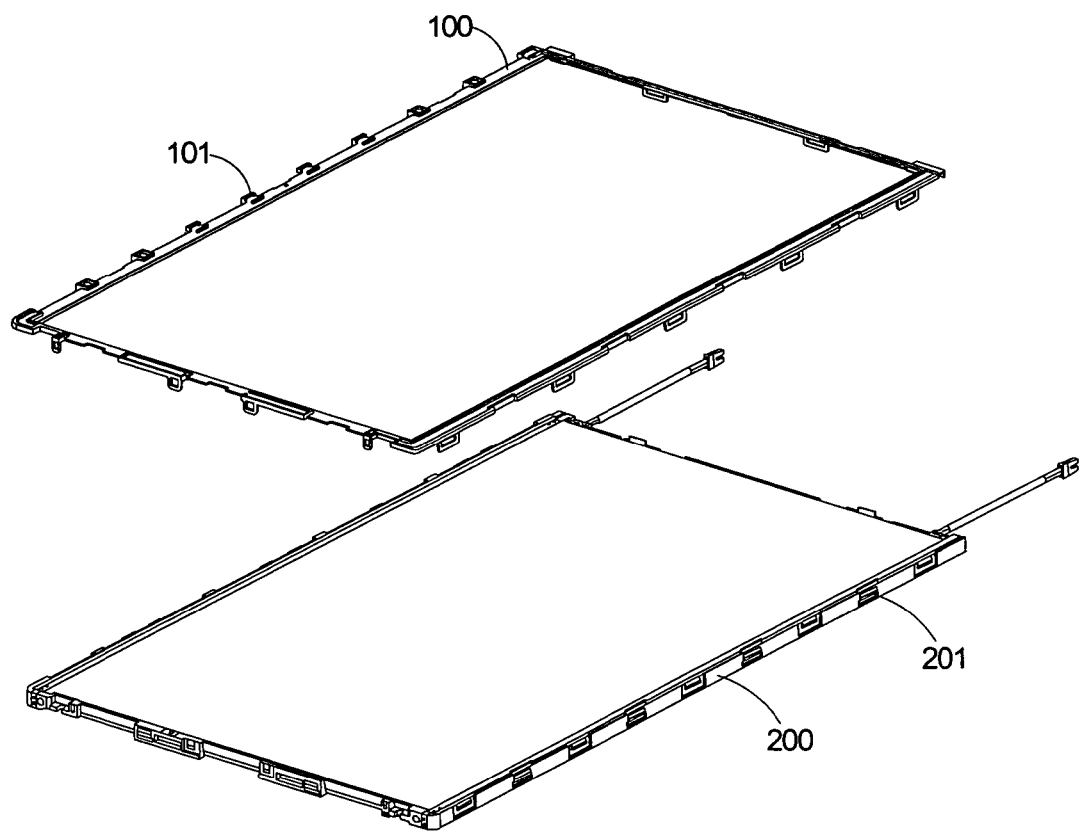
FIG. 1 is a disassembled perspective view of a conventional backlight assembly.
Figure 2:
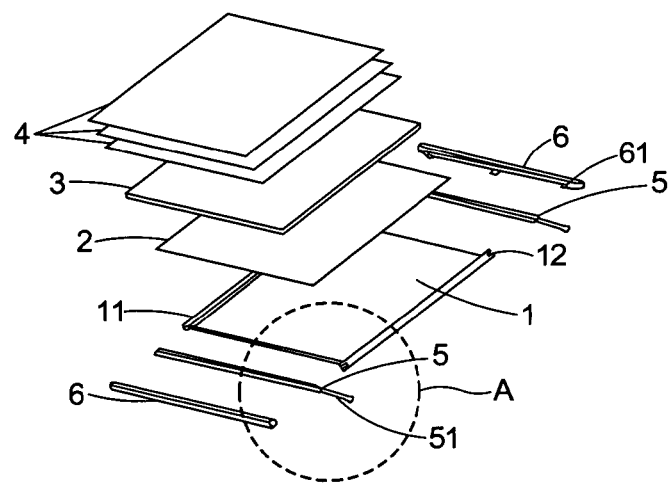
FIG. 2 is a disassembled perspective view of a backlight module in accordance with an embodiment of the present invention.
Figure 2A:
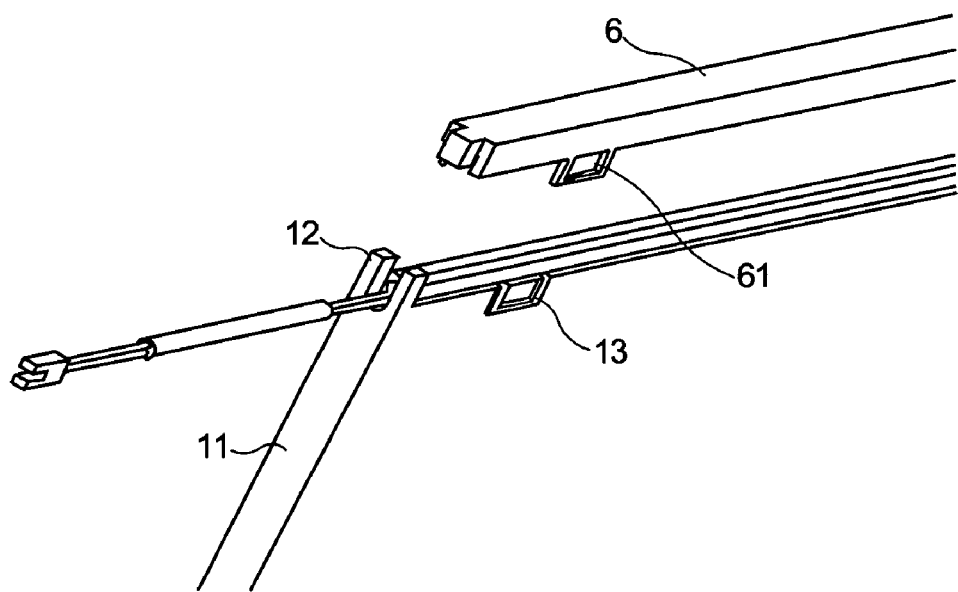
FIG. 2A is an enlarged partial view of FIG. 2.

FIG. 2 is a disassembled perspective view of a backlight module with side fixing frames in accordance with one embodiment of the present invention. The fastening means of the side fixing frame in the embodiment is achieved by a hook-type coupling manner. In the embodiment, the backlight module includes a supporting frame 1, a reflecting plate 2, a light guiding plate 3, several optical films 4, a pair of lamp assemblies 5, and a pair of side fixing frames 6. The side fixing frame 6 is provided with a groove for containing the lamp assembly 5 and at least a hook-type coupling element 61, as shown in FIG. 2A. The supporting frame 1 has two opposite side walls 11 perpendicular to the bottom of the supporting frame 1. A recess 12 is formed at each end of the side wall 11 for a wire 51 of the lamp assembly 5 to pass through. Referring to FIG. 2A, at least one trench-type coupling element 13 is formed on the bottom of the supporting frame 1 close to the sidewall 11 for coupling the hook-type coupling element 61 of the side fixing frame 6. Besides, each end of the side fixing frame 6 can be formed with a protrusion to respectively engage with one of the two recesses 12 of the side wall 11 of the supporting frame 1. As a consequence, the backlight module is more steadily fastened and secured by the side fixing frames 6, improving the capability to resist the external force.

When assembling the backlight module of the embodiment, initially, the reflecting plate 2 is placed on the supporting frame 1. Then, the light guiding plate 3 is placed on the reflecting plate 2. Afterward, the lamp assembly 5 is accommodated at each side portion of the light guiding plate 3. Until this end, now a stack structure is formed. Then, the side fixing frame 6 approaches the stack structure. The groove of the side fixing frame 6 contains the lamp assembly 5 and clamps the supporting frame 1, the reflecting plate 2 and the light guiding plate 3. The hook-type coupling elements 61 of the side fixing frame 6 are engaged with the trench-type coupling elements 13 of the supporting frame 1. As a consequence, the side fixing frames 6 fasten the stack structure. Furthermore, the protrusions of the two ends of the side fixing frame 6 respectively engage with the recesses 12 of the supporting frame 1. Therefore, the backlight module is more steadily fastened and secured by the side fixing frames 6, improving the capability to resist the external force. At last, the optical films 4 are placed on the light guiding plate 3 to complete the assembling of the backlight module of the present invention.

Alternately, the lamp assembly 5 can be first contained in the groove of the side fixing frame 6. Next, the groove of the side fixing frame 6 further contains and clamps the supporting frame 1, the reflecting plate 2, the light guiding plate 3 and the lamp assembly 5. Then, the hook-type coupling elements 61 of the side fixing frame 6 are engaged with the trench-type coupling elements 13 of the supporting frame 1. The protrusions of the two ends of the side fixing frame 6 respectively engage with the recesses 12 of the supporting frame 1. Therefore, the backlight module is more steadily fastened and secured by the side fixing frames 6, improving the capability to resist the external force. Finally, the optical films 4 are placed on the light guiding plate 3 to complete the assembling of the backlight module of the present invention.

FIG. 2A is an enlarged partial view of FIG. 2, in which the side fixing frame 6 is provided with at least a hook-type coupling element 61, and the supporting frame 1 is provided with at least one trench-type coupling element 13, which is the counterpart of the hook-type coupling element 61. However, the side fixing frame 6 can be provided with the trench-type coupling elements instead of the hook-type coupling elements 61, and the supporting frame 1 can be provided with the hook-type coupling elements instead of the trench-type coupling elements 13.

Figure 2B:
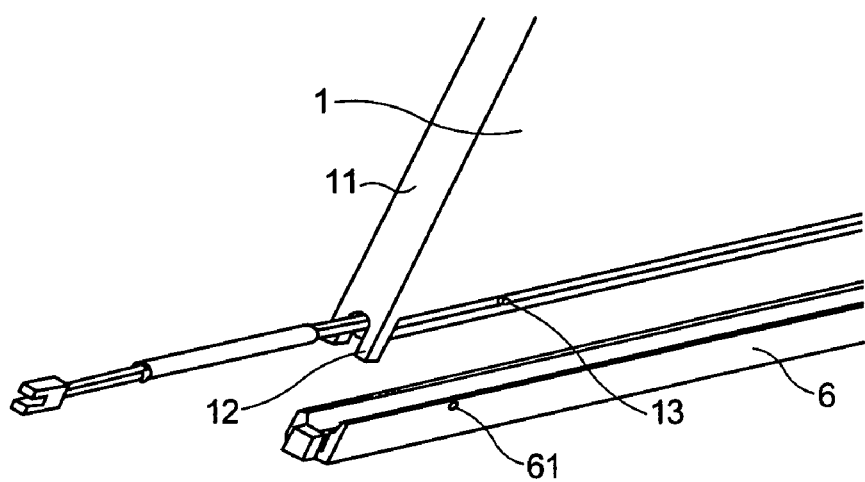
FIG. 2B is an enlarged partial view of FIG. 2, showing one another coupling way between the supporting frame and the side fixing frame.

FIG. 2B is another partial view of FIG. 2, showing another coupling way between the supporting frame 1 and the side fixing frame 6. At least one recess structure 61 is formed on the side fixing frame 6 to serve as a coupling element. At least one protrusion 13 is formed on the supporting frame 1 to engage with the recess structure 61 of the side fixing frame 6. By way of the coupling of the recess structure 61 of the side fixing frame 6 and the protrusion 13 of the supporting frame 1, the backlight module can be fastened. Besides, each end of the side fixing frame 6 can be formed with a protrusion to respectively engage with one of the two recesses 12 of the side wall 11 of the supporting frame 1. As a consequence, the backlight module is more steadily fastened and secured by the side fixing frames 6, improving the capability to resist the external force. However, the side fixing frame 6 can be provided with protrusions instead of the recess structures 61, and the supporting frame 1 can be provided with recess structures instead of protrusions 13. In other words, the coupling elements of the side fixing frame 6 and the supporting frame 1 are not limited to certain types. Any engaging element and it counterpart, which can couple with each other, are suitable for the present invention.

Moreover, the groove of the side fixing frame 6 can have a U-shaped configuration or a C-shaped configuration. The side fixing frame 6 and the supporting frame 1 of the present invention can be made of metallic materials or non-metallic materials. The side fixing frame 6 can also be made of flexible materials so that the flexibility of the side fixing frame 6 can provide clamping strength to fasten the backlight module without using any engaging elements.

Figure 3:
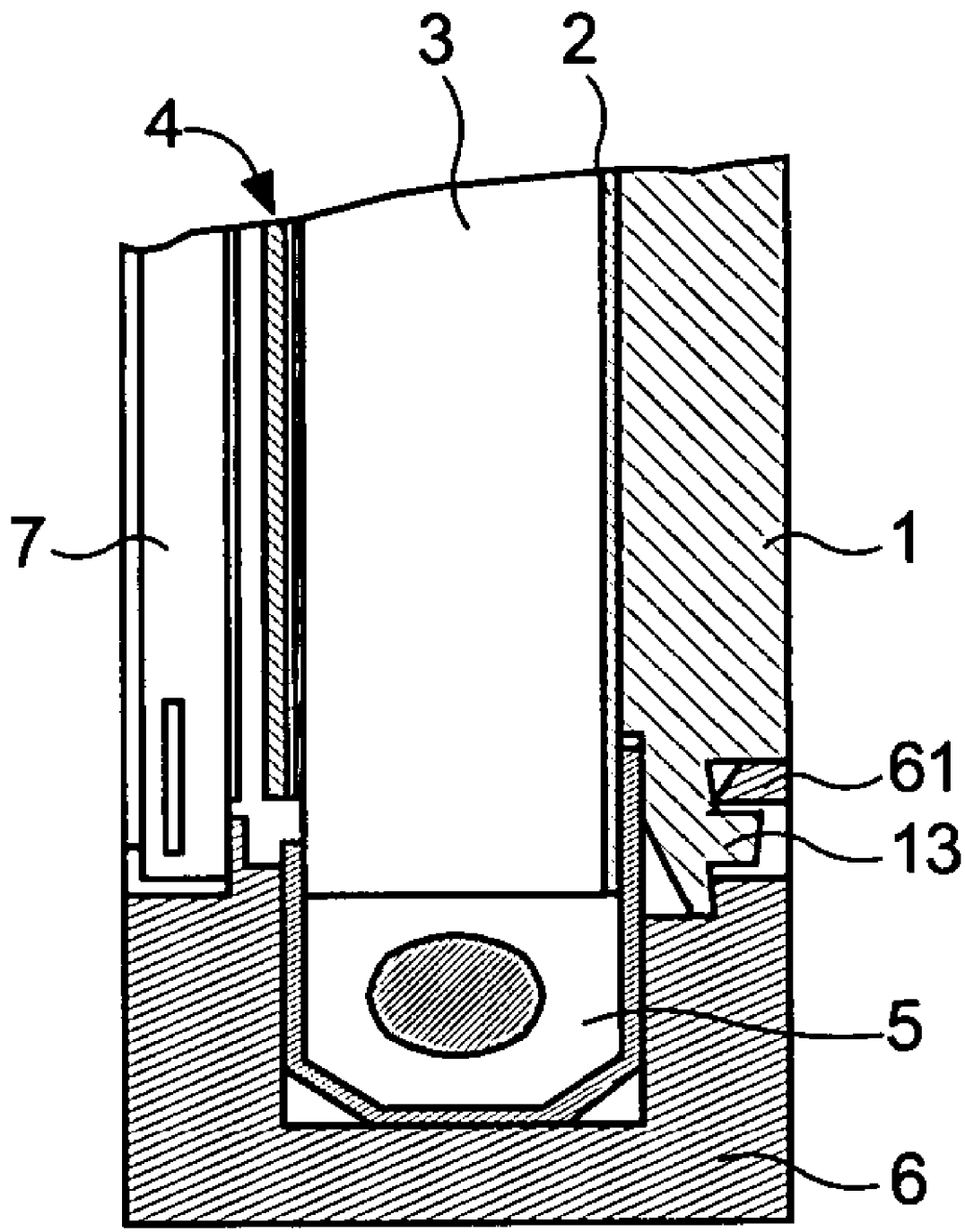
FIG. 3 is an assembled partial cross-sectional view of the present backlight module and a liquid crystal display panel.

FIG. 3 is an assembled partial cross-sectional view of the present backlight module and a liquid crystal display panel, where the liquid crystal display panel is designated as numeral 7. The lamp assembly 5 generally includes a cover and a lamp. The inner surface of the cover is coated with a reflecting layer for reflecting light emitted from the lamp. However, the present invention is not limited to a lamp, so any other light source is also suitable for the present invention. The backlight module of the present invention can be provided with one or more lamp assemblies. In general, the present backlight module is provided with two lamp assemblies, which are respectively set up at each side of the light guiding plate 3, to provide the ideal light source.

Moreover, the stack structure of the present backlight module can be fastened by one or more side fixing frames. It is preferable to use two side fixing frames to fasten the stack structure. The optical film 4 can be a diffusing film, a light condenser, a light multiplier and other film used for liquid crystal display devices.

The embodiments are only used to illustrate the present invention, and are not intended to limit the scope of the invention. Modifications of the embodiments can be made in line with the spirit of the present invention.

What is claimed is:

1. A backlight module, comprising:
   a stack assembly including a supporting frame, a reflecting plate and a light guiding plate, wherein said supporting frame includes at least one engaging element and two opposite side walls with a recess at each end thereof, and wherein said reflecting plate and said light guiding plate are placed between said side walls;
   at least one optical film placed on said stack assembly;
   at least one lamp assembly accommodated at one side portion of said light guiding plate; and
   at least one side fixing frame disposed at a side of said stack assembly where said lamp assembly is accommodated, wherein said side fixing frame includes a groove for containing said lamp assembly and clamping said stack assembly, at least one counterpart of said engaging element engaged with said engaging element, and a protrusion at each end thereof engaged with said recess; and
   wherein said side fixing frame fastens said stack assembly and in combination with said optical film constitutes said backlight module.

2. The backlight module of claim 1, wherein said groove of said side fixing frame is a U-shaped groove.

3. The backlight module of claim 1, wherein said groove of said fixing frame is a C-shaped groove.

4. The backlight module of claim 1, wherein said engaging element is a hook-type coupling element or a trench-type coupling element.

5. The backlight module of claim 1, wherein said engaging element is a protrusion or a recess structure.

6. A method for assembling a backlight module, comprising:
   placing a reflecting plate on a supporting frame, wherein said supporting frame includes at least one engaging element and two opposite side walls with a recess at each end thereof, and said reflecting plate is placed between said side walls;
   placing a light guiding plate on said reflecting plate;
   disposing at least one lamp assembly at one side of said light guiding plate to form a stack assembly;
   inserting at least a side fixing frame at a side of said stack assembly where said lamp assembly is accommodated, wherein said side fixing frame includes a groove for containing said lamp assembly and clamping said stack assembly, at least one counterpart of said engaging element engaged with said engaging element, and a protrusion at each end thereof engaged with said recess; and
   placing at least one optical film on said light guiding plate to complete the assembling of said backlight module.

7. The method of claim 6, wherein said groove of said side fixing frame has a U-shape configuration.

8. The method of claim 6, wherein said groove of said side fixing frame has a C-shaped configuration.

9. The method of claim 6, wherein said engaging element is a hook-type coupling element or a trench-type coupling element.

10. The method of claim 6, wherein said engaging element is a protrusion or a recess structure.

11. A method for assembling a backlight module, comprising:
    placing a reflecting plate on a supporting frame, wherein said supporting frame includes at least one engaging element and two opposite side walls with a recess at each end thereof, and said reflecting plate is placed between said side walls;
    placing a light guiding plate on said reflecting plate to form a stack assembly;
    placing a lamp assembly in a groove of a side fixing frame, said side fixing frame including at least one counterpart of said engaging element and a protrusion at each end thereof;
    mounting said side fixing frame on said stack assembly to clamp said stack assembly by said groove, said counterpart of said engaging element engaged with said engaging element of said supporting frame and said protrusions of said side fixing frame engaged with said recess of said supporting frame; and
    placing at least one optical film on said light guiding plate to complete assembling of said backlight module.

12. The method of claim 11, wherein said groove of said side fixing frame has a U-shape configuration.

13. The method of claim 11, wherein said groove of said side fixing frame has a C-shaped configuration.

14. The method of claim 11, wherein said engaging element is a hook-type coupling element or a trench-type coupling element.

15. The method of claim 11, wherein said engaging element is a protrusion or a recess structure.

* * * * *